(12) United States Patent
Albero et al.

(10) Patent No.: US 12,530,473 B2
(45) Date of Patent: Jan. 20, 2026

(54) STEGANOGRAPHY FOR CUSTOMIZED INFORMATION ACCESS AND CHANGE LOG MANAGEMENT

(71) Applicant: Bank of America Corporation, Charlotte, NC (US)

(72) Inventors: George Albero, Charlotte, NC (US); Maharaj Mukherjee, Poughkeepsie, NY (US); Jinna Kim, Charlotte, NC (US); Timothy Scott Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 150 days.

(21) Appl. No.: 18/243,790

(22) Filed: Sep. 8, 2023

(65) Prior Publication Data

US 2025/0086294 A1    Mar. 13, 2025

(51) Int. Cl.
*G06F 21/53* (2013.01)
*G06F 21/60* (2013.01)
*G06T 1/00* (2006.01)

(52) U.S. Cl.
CPC .......... *G06F 21/604* (2013.01); *G06T 1/0021* (2013.01)

(58) Field of Classification Search
CPC ............. H04L 63/1416; H04L 63/1425; H04L 63/1441
USPC .......................................................... 726/23
See application file for complete search history.

(56) References Cited

U.S. PATENT DOCUMENTS

| | | | |
|---|---|---|---|
| 8,316,237 B1 * | 11/2012 | Felsher | H04L 63/061 380/282 |
| 10,425,461 B1 | 9/2019 | Zaehring | |
| 10,604,274 B1 * | 3/2020 | Zaehring | G06F 1/1601 |
| 10,706,160 B1 | 7/2020 | Mohapatra | |
| 11,080,809 B2 | 8/2021 | Baluja | |
| 11,361,075 B1 * | 6/2022 | Singh | G06F 21/554 |
| 11,451,865 B1 | 9/2022 | Rader | |
| 2011/0055585 A1 * | 3/2011 | Lee | H04L 9/3226 713/183 |

(Continued)

OTHER PUBLICATIONS

Sanjeev Manchanda; Customized and Secure Image Steganography Through Random Numbers Logic, psu.edu; 2007; pp. 1-16.*

*Primary Examiner* — Monjur Rahim
(74) *Attorney, Agent, or Firm* — Banner & Witcoff, Ltd.

(57) ABSTRACT

A computing platform may generate a graphical user interface. The computing platform may embed, into the graphical user interface, steganography, which may include information corresponding to the graphical user interface that is not displayed on the graphical user interface. The computing platform may receive, from a user device of a user, an interface access request and user access credentials. The computing platform may identify, based on the user access credentials, access permissions of the user, which may define portions of the steganography to which the user has access. The computing platform may record, in a change log, interactions of the user with the graphical user interface. The computing platform may compare the interactions in the change log with the access permissions to identify whether or not unauthorized access is detected. Based on detecting the unauthorized access, the computing platform may initiate security actions for the graphical user interface.

19 Claims, 8 Drawing Sheets

(56) References Cited

U.S. PATENT DOCUMENTS

| | | | |
|---|---|---|---|
| 2015/0058931 A1* | 2/2015 | Miu | G06Q 20/02 |
| | | | 707/784 |
| 2015/0058950 A1* | 2/2015 | Miu | G06F 21/31 |
| | | | 726/7 |
| 2015/0059003 A1* | 2/2015 | Bouse | G06F 16/2379 |
| | | | 726/28 |
| 2016/0070923 A1* | 3/2016 | Inotay | G06K 19/06037 |
| | | | 726/6 |
| 2017/0230181 A1* | 8/2017 | Pogorelik | H04N 1/32229 |
| 2019/0327215 A1 | 10/2019 | Bastian et al. | |
| 2019/0356476 A1 | 11/2019 | Zheng et al. | |
| 2020/0134022 A1 | 4/2020 | Millius et al. | |
| 2020/0273375 A1* | 8/2020 | Sanchez | G06N 20/00 |
| 2020/0382459 A1 | 12/2020 | Strubbe et al. | |
| 2021/0133577 A1* | 5/2021 | Srinivasan | G06N 20/00 |
| 2021/0150312 A1 | 5/2021 | Lwowski et al. | |
| 2021/0192019 A1 | 6/2021 | Lwowski et al. | |
| 2021/0256108 A1 | 8/2021 | Kapinos et al. | |
| 2021/0352053 A1 | 11/2021 | Melodia et al. | |
| 2022/0027568 A1 | 1/2022 | Millius et al. | |
| 2022/0132216 A1* | 4/2022 | Onaodowan | H04N 21/47815 |
| 2022/0188451 A1* | 6/2022 | Groth | G06F 21/577 |
| 2022/0253563 A1 | 8/2022 | Bhunia et al. | |
| 2022/0398812 A1 | 12/2022 | Sloane | |
| 2022/0405389 A1* | 12/2022 | Singh | G06F 21/565 |
| 2023/0027783 A1 | 1/2023 | Kuta et al. | |
| 2023/0066458 A1 | 3/2023 | Ahn et al. | |
| 2023/0120852 A1 | 4/2023 | Hopkins | |
| 2023/0269246 A1* | 8/2023 | Mohanty | H04L 63/0853 |
| | | | 726/7 |
| 2024/0127389 A1* | 4/2024 | Low | H04L 9/0869 |

\* cited by examiner

STEGANOGRAPHY FOR CUSTOMIZED INFORMATION ACCESS AND CHANGE LOG MANAGEMENT

BACKGROUND

In some instances, information associated with interfaces and/or workflows may be long and complex. Accordingly, users may be presented with copious amounts of information that might not be relevant to, of interest to, and/or otherwise accessible by the users. Additionally, in some instances, such information may be presented to and accessed by unauthorized users. Accordingly, it may be important to provide improved methods for information access and/or security.

SUMMARY

Aspects of the disclosure provide effective, efficient, scalable, and convenient technical solutions that address and overcome the technical problems associated with information security and access management. In one or more instances, a computing platform having at least one processor, a communication interface, and memory may generate a graphical user interface. The computing platform may embed, into the graphical user interface, steganography, which may include information corresponding to the graphical user interface that is not displayed on the graphical user interface. The computing platform may receive, from a user device of a user, an interface access request and user access credentials. The computing platform may identify, based on the user access credentials, access permissions of the user, which may define portions of the steganography to which the user has access. The computing platform may record, in a change log, interactions of the user with the graphical user interface. The computing platform may compare the interactions in the change log with the access permissions to identify whether or not unauthorized access is detected. Based on detecting the unauthorized access, the computing platform may initiate one or more security actions for the graphical user interface.

In one or more instances, the user interface may include one or more interface elements, and the one or more interface elements may include one or more of: an image, a video, a pixel, an audio file, or a non-fungible token. In one or more instances, the steganography may be embedded within the one or more interface elements.

In one or more examples, embedding the steganography may include nesting a plurality of different levels of steganography within the user interface. In one or more examples, the access permissions may define that the user has access to a first level of steganography of the plurality of different levels of steganography and does not have access to a second level of steganography of the plurality of different levels of steganography.

In one or more instances, the second level of steganography may be embedded within the first level of steganography. In one or more instances, recording the user interactions may include recording one or more of: decoding of the steganography, modification of the steganography, or addition of new steganography.

In one or more examples, the computing platform may re-format, based on the access permissions, the steganography by: 1) relocating first information, to which the user has access, to an initial level of the steganography, and 2) relocating second information, to which the user does not have access, to a second level of the steganography, where the second level of the steganography may be embedded within the initial level of the steganography, and where the initial level of the steganography and the second level of the steganography may correspond to a steganography scheme. In one or more examples, the steganography scheme may be unique to the user.

In one or more instances, initiating the one or more security actions may include one or more of: routing the graphical user interface to a secure sandbox, routing the graphical user interface to an artificial intelligence (AI) engine, modifying the access permissions, or routing the graphical user interface for manual review. In one or more instances, the secure sandbox may be configured to execute underlying code of the graphical user interface to identify errors. In one or more instances, the AI engine may be configured to automatically identify errors.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
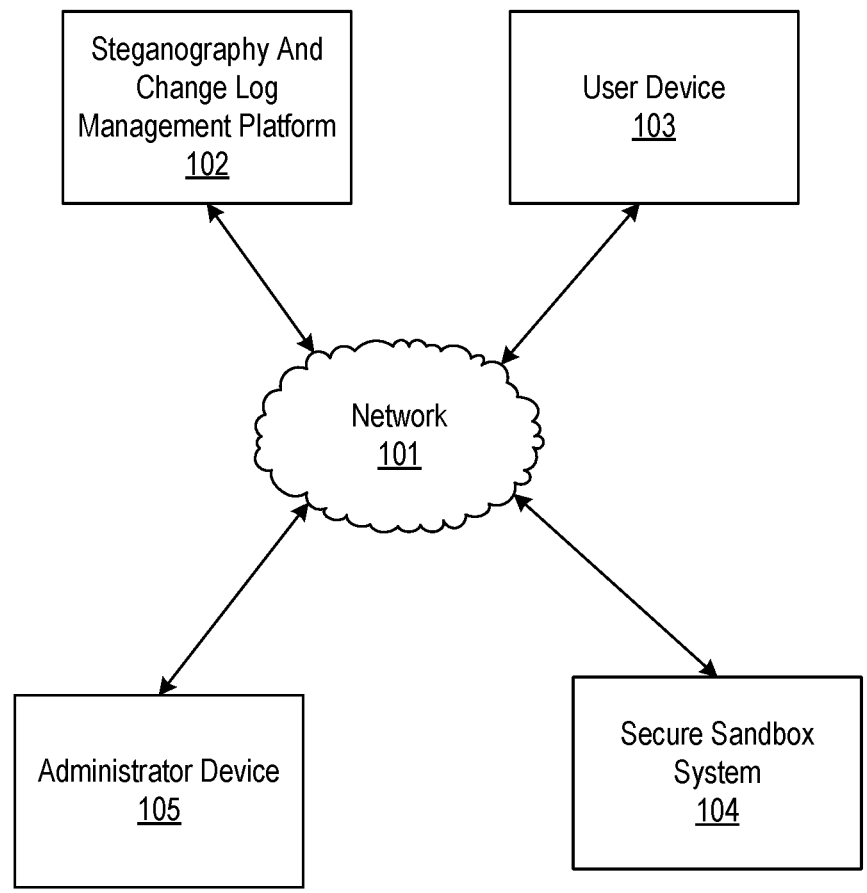
FIGS. 1A-1B depict an illustrative computing environment for using steganography for customized information access and change log management in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for embedding steganography for customized information access and change log management are described herein.

With technological advances, the amount of useful data and business-as-usual (BAU) coding has grown exponentially. Similarly, workflows have become longer and more complex. As a result, associated support costs may experience rapid growth. Accordingly, described herein is a solution to leverage steganography to elegantly hide useful data and logical path information. Artificial intelligence (AI)

and/or machine learning (ML) may then be leveraged to remediate issues automatically and/or capture large amounts of information for quick human resolution.

This may be relevant to organizations that use data and code on a regular basis. There may be a need to have data and pieces of code readily accessible but out of plain sight (readily accessible with context may be useful). The proposed solution may leverage steganography to elegantly hide useful data and code that might not currently be used in production in various digital formats. The solution may be used behind the scenes internally, as well as externally, on visible user interfaces. Data, code, parts of a workflow, or the like may be tucked neatly in an image, video, or other art/mixed media. Accordingly, they may be hidden from plain sight like a digital/online version of a drawer, to be used for functions needed at a later time or for coding adjustments (e.g., code modernization and remediation, adding/editing fields, maintaining change logs, data references, or the like). If there is something unusual or erroneous with the data at any point (whether coded or decoded), a snippet and/or screenshot may be sent to an AI model for automated correction. If the error cannot be automatically addressed, the AI model may log the error in the system helpdesk for human resolution. This may support the user by denoting, in real time, any anomalies and/or detected concerns with corresponding response actions, in addition to providing automated reporting of issues for cataloging.

This solution may purposefully implement steganography to improve business support functions that are online/digital, using software/hardware, and/or otherwise include functions dependent on data and coding. The data and coding might not have to be confidential to leverage steganography. There may be benefits of implementing steganography not only for aesthetic factors, but for sheer practicality of not having to store large or irrelevant (but handy) information elsewhere. Coding may be adjusted for a multitude of reasons including customization, remediation, modernization, and/or otherwise. It may be less confusing for developers or any human to see so much information out all at once especially in raw data or coding formats. Thus, information may, through steganography, be embedded in images/pixels, videos, NFTs, and/or other art/mixed media. However, similar to a digital/online version of a kitchen drawer, there may be specific times that other pieces of code, workflow, or data fields may be needed (like pulling out specialized cooking utensils such as a mandolin slicer). Steganography may be an elegant and seamless way to pull out and edit data fields and code when needed, regardless of the business function whether it is as basic as supporting a bank database or as complex as training a fraud model. To decode the steganography, AI may be coupled with computer vision to pull out/parcel exactly what may be needed when it is needed. When steganography is decoded, the specific decoding and timing may be tracked in an automated change log. The AI may also be able to determine if there is error in the data, workflow, or bits of aged/old code that may warrant further review for automatic resolution. However, if the error is more complex and cannot be fixed automatically, then AI may log the error in the relevant system helpdesk for review and manual fix/resolution.

These and other features are described in greater detail below.

Figure 1B:
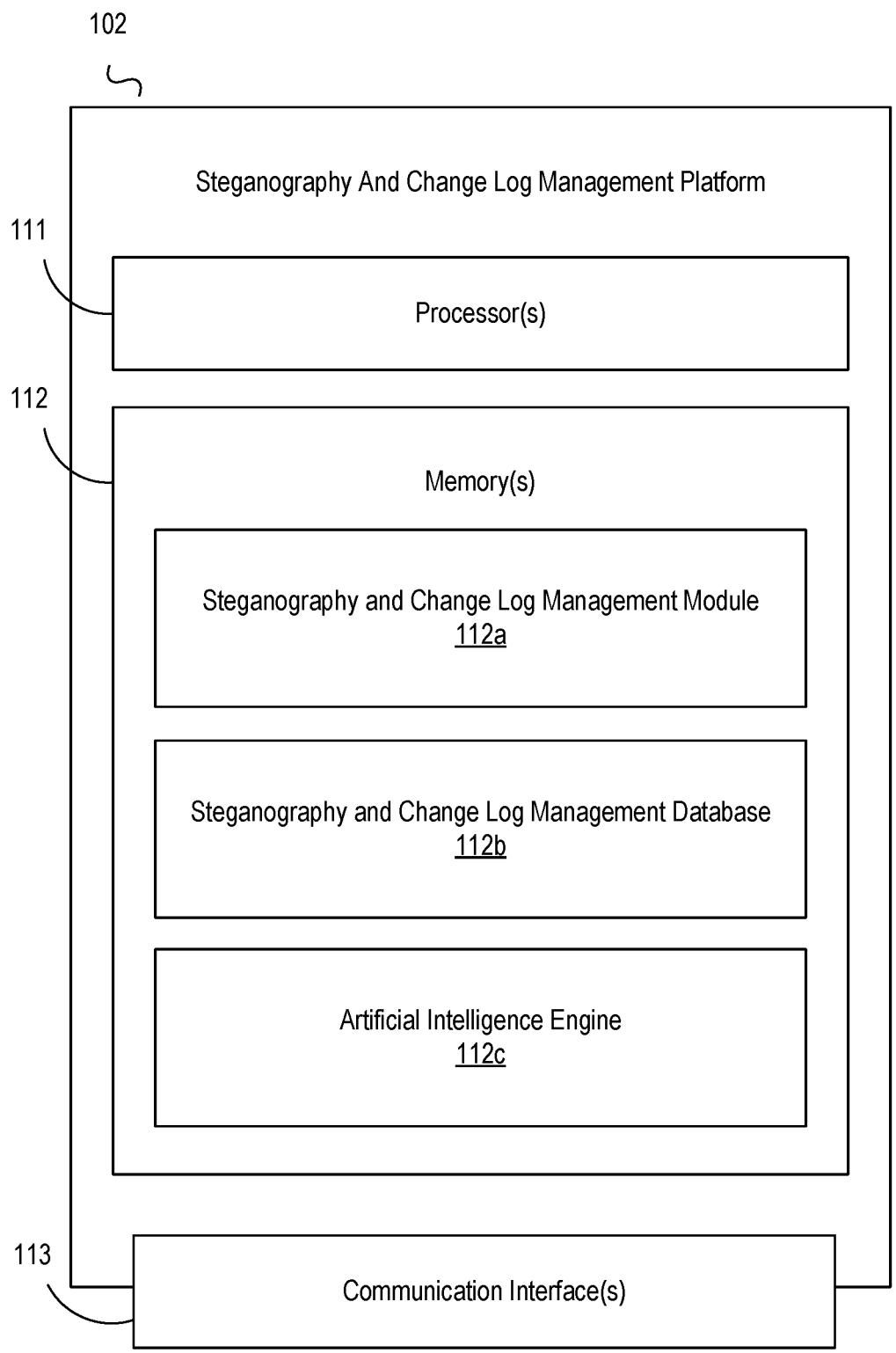

FIGS. 1A-1B depict an illustrative computing environment for using steganography for customized information access and change log management in accordance with one or more example embodiments. Referring to FIG. 1A, computing environment 100 may include one or more computer systems. For example, computing environment 100 may include steganography and change log management platform 102, user device 103, secure sandbox system 104, and administrator device 105.

As described further below, steganography and change log management platform 102 may be a computer system that includes one or more computing devices (e.g., servers, server blades, or the like) and/or other computer components (e.g., processors, memories, communication interfaces) that may be used to embed steganography into interfaces, codes, and/or other files. Additionally, in some instances, the steganography and change log management platform 102 may be configured to establish, maintain, and/or otherwise update a change log, which may, e.g., be used to monitor interactions with the steganography and confirm compliance with access permissions.

User device 103 may be and/or otherwise include a laptop computer, desktop computer, mobile device, tablet, smartphone, and/or other device that may be used by an individual to interact with interfaces, scripts, files, and/or other information. In some instances, user device 103 may be configured to display one or more user interfaces (e.g., embedded steganography interfaces, or the like).

Secure sandbox system 104 may be a computer system that includes one or more computing devices (e.g., servers, server blades, or the like) and/or other computer components (e.g., processors, memories, communication interfaces) that may be used to execute and/or otherwise simulate interfaces, scripts, files, and/or other information to detect errors, malware, or the like.

Administrator device 105 may be and/or otherwise include a laptop computer, desktop computer, mobile device, tablet, smartphone, and/or other device that may be used by an individual (such as a system administrator and/or other employee) to perform information access management and/or otherwise initiate security actions. In some instances, administrator device 105 may be configured to display one or more user interfaces (e.g., unauthorized access notifications, or the like).

Although a user device 103 and administrator device 105 are shown, any number of such devices may be deployed in the systems/methods described below without departing from the scope of the disclosure.

Computing environment 100 also may include one or more networks, which may interconnect steganography and change log management platform 102, user device 103, secure sandbox system 104, administrator device 105, or the like. For example, computing environment 100 may include a network 101 (which may interconnect, e.g., steganography and change log management platform 102, user device 103, secure sandbox system 104, administrator device 105, or the like).

In one or more arrangements, steganography and change log management platform 102, user device 103, secure sandbox system 104, and administrator device 105 may be any type of computing device capable of sending and/or receiving requests and processing the requests accordingly. For example, steganography and change log management platform 102, user device 103, secure sandbox system 104, administrator device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of steganography and change log management platform 102, user device 103, secure sandbox system 104, and administrator device 105 may, in some instances, be special-purpose computing devices configured to perform specific functions.

Referring to FIG. 1B, steganography and change log management platform 102 may include one or more processors 111, memory 112, and communication interface 113. A data bus may interconnect processor 111, memory 112, and communication interface 113. Communication interface 113 may be a network interface configured to support communication between steganography and change log management platform 102 and one or more networks (e.g., network 101, or the like). Memory 112 may include one or more program modules having instructions that when executed by processor 111 cause steganography and change log management platform 102 to perform one or more functions described herein and/or one or more databases that may store and/or otherwise maintain information which may be used by such program modules and/or processor 111. In some instances, the one or more program modules and/or databases may be stored by and/or maintained in different memory units of steganography and change log management platform 102 and/or by different computing devices that may form and/or otherwise make up steganography and change log management platform 102. For example, memory 112 may have, host, store, and/or include steganography and change log management module 112a, steganography and change log management database 112b, and/or artificial intelligence engine 112c.

Steganography and change log management module 112a may have instructions that direct and/or cause steganography and change log management platform 102 to provide improved information management and security techniques, as discussed in greater detail below. Steganography and change log management database 112b may store information used by steganography and change log management module 112a and/or steganography and change log management platform 102 in application of advanced techniques to provide improved information management and security functions, and/or in performing other functions. Artificial intelligence engine 112c may train, host, and/or otherwise refine one or more models that may be used to perform information management, error correction, provide information security, and/or perform other functions.

Figure 2A:
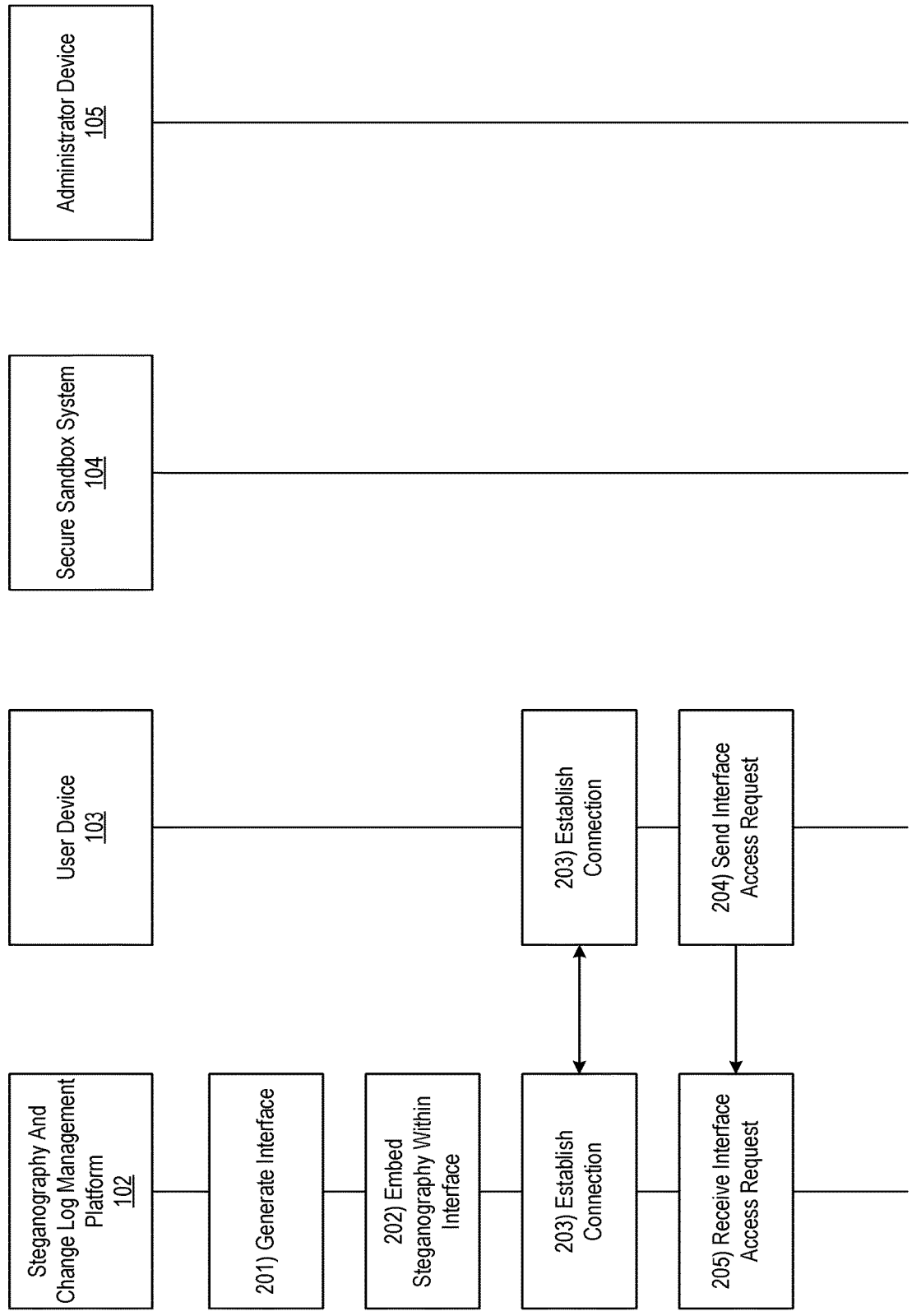
FIGS. 2A-2D depict an illustrative event sequence for using steganography for customized information access and change log management in accordance with one or more example embodiments.

FIGS. 2A-2D depict an illustrative event sequence for using steganography for customized information access and change log management in accordance with one or more example embodiments. Referring to FIG. 2A, at step 201, the steganography and change log management platform 102 may generate a graphical user interface. For example, the steganography and change log management platform 102 may generate a graphical user interface that includes one or more user interface elements (e.g., images, videos, NFTs, audio files, and/or other elements). In some instances, the steganography and change log management platform 102 may generate an interface corresponding to a service provided by and/or otherwise supported by the steganography and change log management platform 102 (e.g., a mobile banking application, online banking portal, customer service portal, and/or otherwise).

Figure 4:
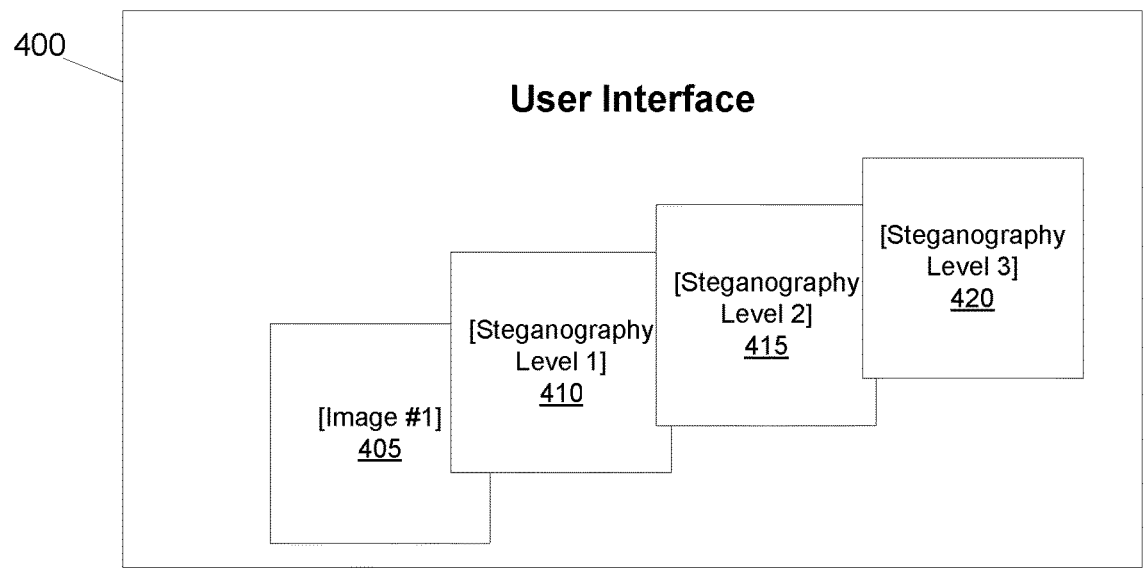
FIGS. 4-5 depict illustrative user interfaces for using steganography for customized information access and change log management in accordance with one or more example embodiments.

At step 202, the steganography and change log management platform 102 may embed steganography within the interface. For example, the steganography and change log management platform 102 may embed code, metadata, and/or other information within the interface. In some instances, the steganography and change log management platform 102 may embed the steganography within one of the user interface elements. In some instances, the steganography and change log management platform 102 may embed multiple layers of steganography (e.g., a first layer, a second layer within the first layer, a third layer within the second layer, or the like). This is shown, for example, in graphical user interface 400 of FIG. 4, in which steganography level one 410 may be embedded within the image one 405, the steganography level two 415 may be embedded within the steganography level one 410, and the steganography level three 420 may be embedded within the steganography level two 415. In some instances, the steganography (and/or the various layers therein) may be assigned associated access permissions, which may, e.g., define which individuals may access the information in the steganography (e.g., based on user identifiers, group identifiers, or the like).

Embedding such steganography may serve two purposes (among others). First, by nesting information within steganography, the steganography and change log management platform 102 may effectively conceal information until it is specifically accessed or needed (e.g., similar to storing the additional information in a "drawer" within the interface). This may result in a cleaner and less congested interface, which may, e.g., be more aesthetically pleasing and easily navigable when compared to an interface with more information. Second, the use of steganography may conceal information from unauthorized individuals, and attempts to decode, modify, and/or otherwise access the steganography may be observed, recorded, and used for comparison to access permissions accordingly, as is described further below.

With further reference to FIG. 2A, at step 203, the steganography and change log management platform 102 may establish a connection with the user device 103. For example, the steganography and change log management platform 102 may establish a first wireless data connection with the user device 103 to link the steganography and change log management platform 102 to the user device (e.g., in preparation for communicating interface access requests). In some instances, the steganography and change log management platform 102 may identify whether or not a connection is already established with the user device 103. If a connection is already established with the user device 103, the steganography and change log management platform 102 might not re-establish the connection. Otherwise, if a connection is not yet established with the user device 103, the steganography and change log management platform 102 may establish the first wireless data connection as described herein.

At step 204, the user device 103 may send an interface access request (e.g., requesting access to the user interface generated at step 201) to the steganography and change log management platform 102. For example, the user device 103 may send the interface access request to the steganography and change log management platform 102 while the first wireless data connection is established. In some instances, in sending the interface access request, the user device 103 may send user access credentials corresponding to a user of the user device 103 (e.g., a username, password, device identifier, group identifier, and/or other information).

At step 205, the steganography and change log management platform 102 may receive the interface access request. For example, the steganography and change log management platform 102 may receive the interface access request via the communication interface 113 and while the first wireless data connection is established.

Figure 2B:
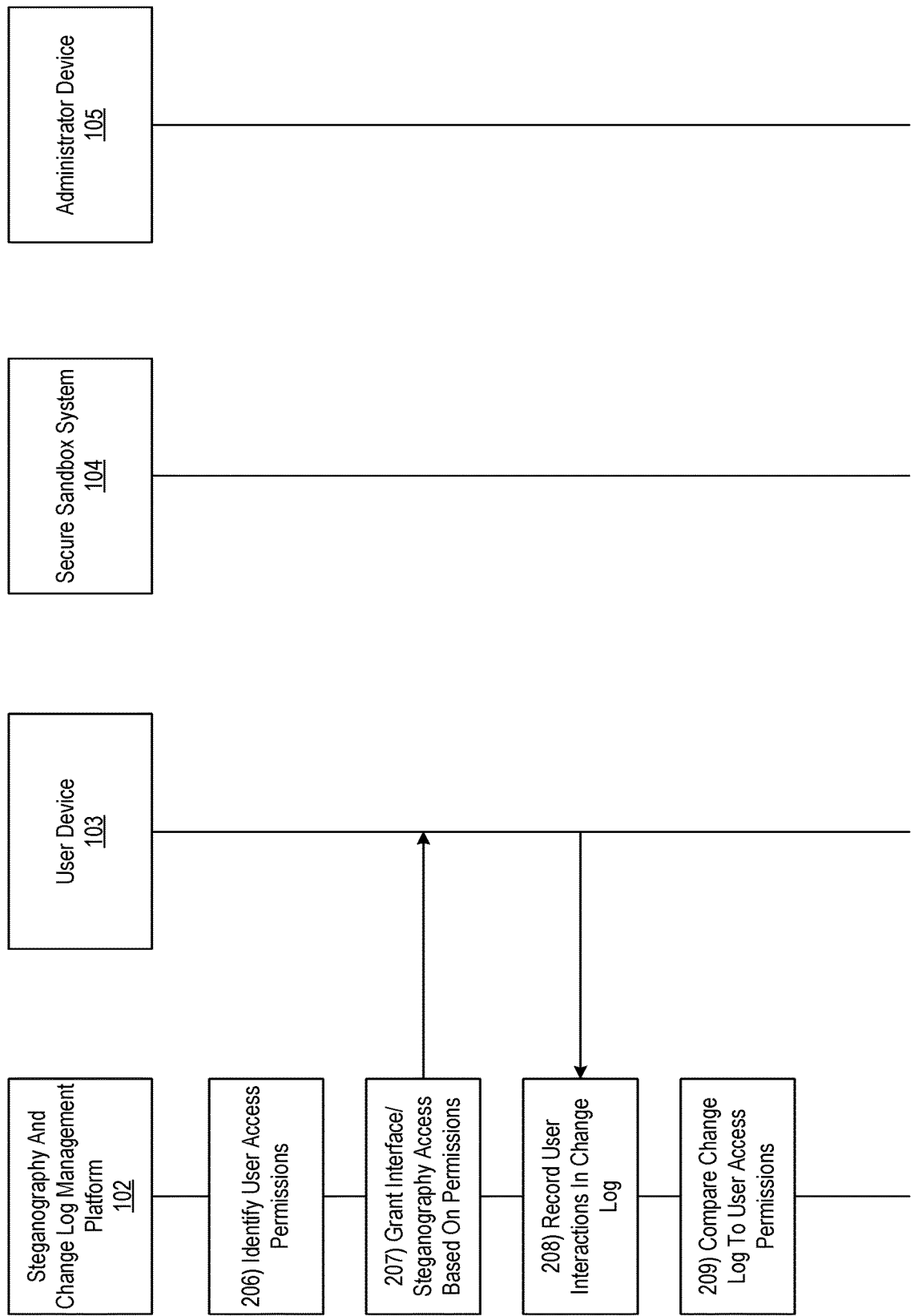

Referring to FIG. 2B, at step 206, the steganography and change log management platform 102 may identify user access permissions for the user. For example, the steganography and change log management platform 102 may reference an access permission table and/or other mechanism for storing correlations between user identities and their corresponding access permissions to identify the user access permissions. In doing so, the steganography and change log management platform 102 may identify which aspects of the interface and/or steganography the user is authorized to access. For example, while the user may be authorized to access a first level of steganography, the user might not be authorized to access a second level of steganography, where the second level of steganography may be embedded within the first level of steganography.

At step 207, the steganography and change log management platform 102 may grant the user device 103 access to the interface and/or portions of the steganography based on the user access permissions. In some instances, in granting the user device 103 access to the interface, the steganography and change log management platform 102 may reformat the steganography and/or interface to relocate information between different levels of steganography. For example, the steganography and change log management platform 102 may relocate first information, to which the user has access, to an initial level of the steganography and second information, to which the user does not have access, to a second level of the steganography. This may, in some instances, be referred to as a customized steganography scheme, which may, e.g., be customized on a per user basis based on their access permissions.

At step 208, the steganography and change log management platform 102 may record user interactions with the interface in a change log. For example, the steganography and change log management platform 102 may record attempts to decode, access, and/or otherwise modify the steganography, add new steganography, remove the steganography, and/or otherwise interact with the steganography. In recording the user interactions to the change log, the steganography and change log management platform 102 may store information of the interaction, the user, the time, the date, and/or other information.

At step 209, the steganography and change log management platform 102 may compare the change log to the user access permissions to identify whether unauthorized interactions are detected. If the steganography and change log management platform 102 identifies, based on the comparison, that no unauthorized interactions are detected, the event sequence may end. Otherwise, if the steganography and change log management platform 102 identifies, based on the comparison, that unauthorized interactions are detected, the steganography and change log management platform 102 may proceed to step 210.

Figure 2C:
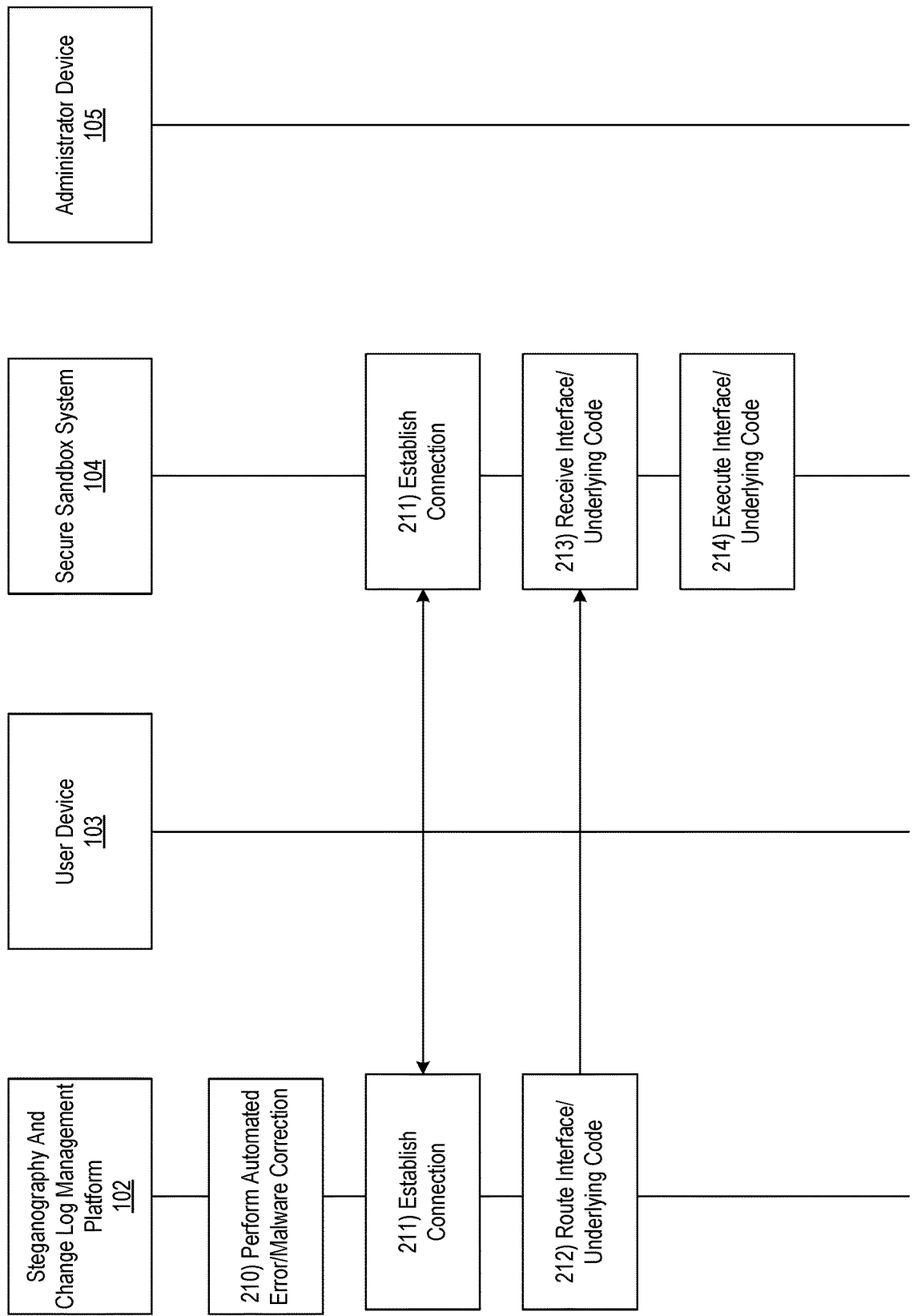

Referring to FIG. 2C, at step 210, the steganography and change log management platform 102 may attempt to remediate, modify, and/or otherwise address any malware, errors, and/or other issues in the underlying code of the interface using an AI or ML model.

For example, the steganography and change log management platform 102 may train an error remediation model. For example, steganography and change log management platform 102 may train the error remediation model to identify a corrective action. For example, steganography and change log management platform 102 may receive historical interaction information such as snippets, screenshots, or the like of user interfaces, underlying code, metadata, steganography, and/or other information, along with corresponding error information and corrective actions used to remediate the errors.

The steganography and change log management platform 102 may input the historical information into the error remediation model to establish stored correlations between such historical information and corresponding corrective actions. In doing so, the steganography and change log management platform 102 may train the error remediation model to identify, based on snippets, screenshots, and/or other information of an interface, the underlying code, corresponding metadata, steganography, and/or other information, corrective actions to remediate any errors, remove any malware, and/or otherwise update the interface. For example, the user may have modified the interface, underlying code, corresponding metadata, steganography, and/or otherwise, either maliciously (e.g., to embed malware, logic bombs, or the like) or without malicious intentions (e.g., just introduced an error).

In some instances, in training the error remediation model, the steganography and change log management platform 102 may train a supervised learning model (e.g., decision tree, bagging, boosting, random forest, neural network, linear regression, artificial neural network, support vector machine, deep reinforcement learning model, and/or other supervised learning model), unsupervised learning model (e.g., classification, clustering, anomaly detection, feature engineering, feature learning, and/or other unsupervised learning models), and/or other model.

Once trained, the steganography and change log management platform 102 may produce, using the error remediation model and based on the interface, underlying code, corresponding metadata, steganography, and/or other information, a proposed corrective action. To do so, steganography and change log management platform 102 may input information of the interface (e.g., a screenshot, snippet, or the like) into the error remediation model, which may compare such information to historical information and corrective actions to identify a corresponding corrective action accordingly.

Once corrective actions are identified, the steganography and change log management platform 102 may update the error remediation model based on the input information, the corrective actions, and/or other information. In doing so, the steganography and change log management platform 102 may continue to refine the error remediation model using a dynamic feedback loop, which may, e.g., increase the accuracy and effectiveness of the models in automatically remediating errors, malware, and/or other issues in interfaces and/or the corresponding code/scripts.

For example, the steganography and change log management platform 102 may use the input information, corrective actions, and/or other information to reinforce, modify, and/or otherwise update the error remediation model, thus causing the model to continuously improve (e.g., in terms of performance monitoring).

In some instances, the steganography and change log management platform 102 may continuously refine the error remediation model. In some instances, steganography and change log management platform 102 may maintain an accuracy threshold for the error remediation model, and may pause refinement (through the dynamic feedback loops) of the model if the corresponding accuracy is identified as greater than the corresponding accuracy threshold. Similarly, if the accuracy fails to be equal or less than the given accuracy threshold, the steganography and change log management platform 102 may resume refinement of the models through the corresponding dynamic feedback loop.

In some instances, based on the analysis of the error remediation model, the steganography and change log management platform 102 may proceed to one or more of steps 212, 215, or 219 based on a recommended action output by the error remediation model.

At step 211, the steganography and change log management platform 102 may establish a connection with the secure sandbox system 104. For example, the steganography and change log management platform 102 may establish a second wireless data connection with the secure sandbox system 104 to link the steganography and change log management platform 102 to the secure sandbox system 104 (e.g., in preparation for routing the interface and/or underlying code for simulation). In some instances, the steganography and change log management platform 102 may identify whether or not a connection is already established with the secure sandbox system 104. If a connection is already established with the secure sandbox system 104, the steganography and change log management platform 102 might not re-establish the connection. If a connection is not yet established with the secure sandbox system 104, the steganography and change log management platform 102 may establish the second wireless data connection as described herein.

At step 212, the steganography and change log management platform 102 may route the interface, underlying code, metadata, and/or other information to the secure sandbox system 104. For example, the steganography and change log management platform 102 may route the interface to the secure sandbox system 104 via the communication interface 113 and while the second wireless data connection is established.

At step 213, the secure sandbox system 104 may receive the interface, underlying code, metadata, and/or other information sent at step 212. For example, the secure sandbox system 104 may receive the interface while the second wireless data connection is established.

At step 214, the secure sandbox system 104 may simulate and/or otherwise execute the interface, underlying code, metadata, and/or other information to identify any malware, and/or other errors. In some instances, the secure sandbox system 104 may provide the results of the simulation back to the steganography and change log management platform 102, which may e.g., initiate an automated correction and/or remediation of the malware, error, or the like. Additionally or alternatively, the secure sandbox system 104 may provide the results to the administrator device 105 and/or another user device, which may, e.g., initiate a manual correction of the malware, error, or the like.

Figure 2D:
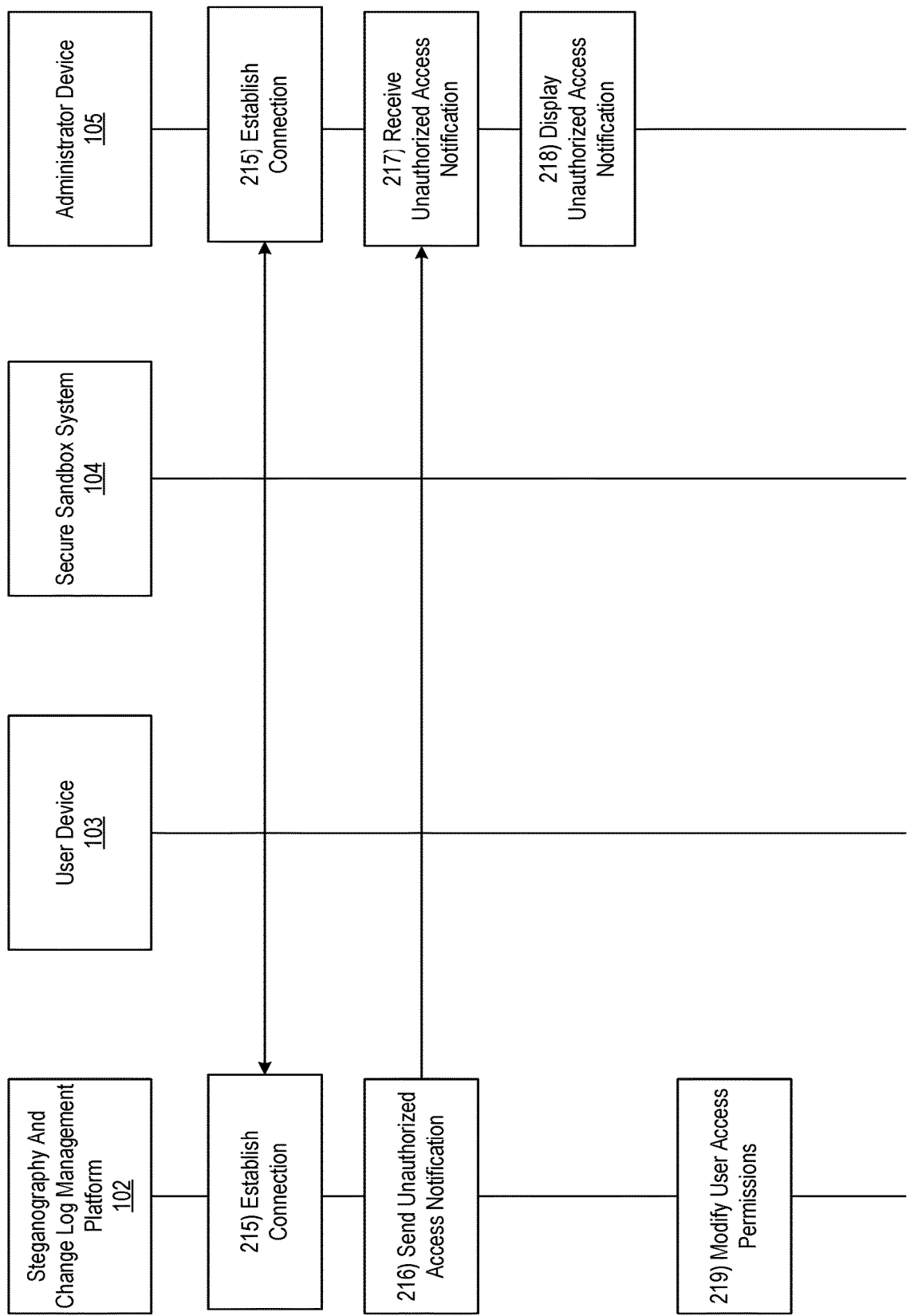

Referring to FIG. 2D, at step 215, the steganography and change log management platform 102 may establish a connection with the administrator device 105. For example, the steganography and change log management platform 102 may establish a third wireless data connection with the administrator device 105 to link the steganography and change log management platform 102 to the administrator device 105 (e.g., in preparation for sending notifications, or the like). In some instances, the steganography and change log management platform 102 may identify whether or not a connection is already established with the administrator device 105. If a connection is already established with the administrator device 105, the steganography and change log management platform 102 might not re-establish the connection. Otherwise, if a connection is not yet established with the administrator device 105, the steganography and change log management platform 102 may establish the third wireless data connection as described herein.

At step 216, the steganography and change log management platform 102 may send an unauthorized access notification to the administrator device 105. For example, the steganography and change log management platform 102 may send the unauthorized access notification to the administrator device 105 via the communication interface 113 and while the third wireless data connection is established. In some instances, the steganography and change log management platform 102 may also send one or more commands directing the steganography and change log management platform 102 to display the unauthorized access notification.

At step 217, the administrator device 105 may receive the unauthorized access notification sent at step 216. For example, the administrator device 105 may receive the unauthorized access notification while the third wireless data connection is established. In some instances, the administrator device 105 may also receive the one or more commands directing the administrator device 105 to display the unauthorized access notification.

Figure 5:
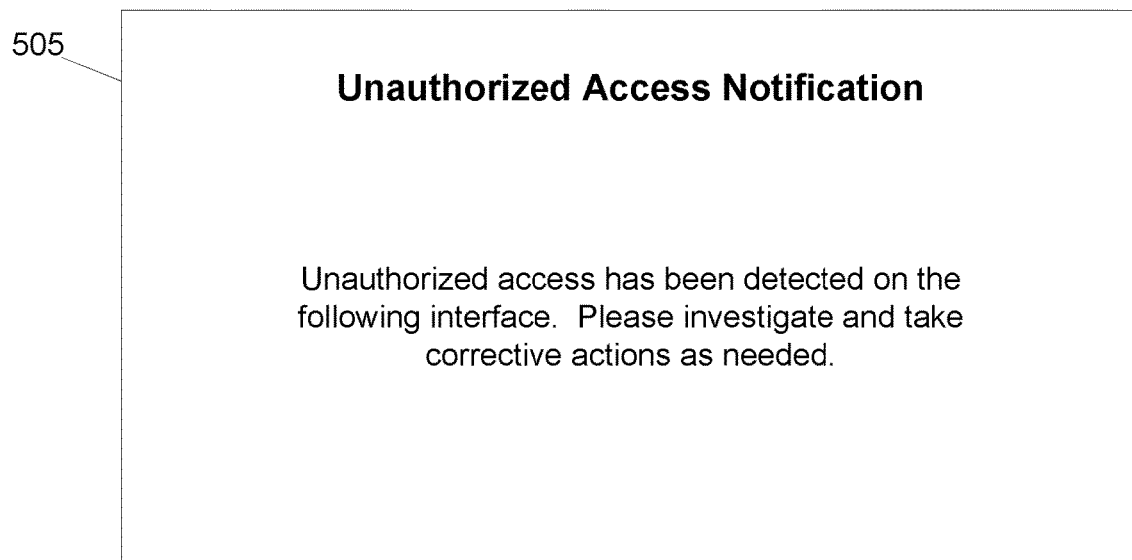

At step 218, based on or in response to the one or more commands directing the administrator device 105 to display the unauthorized access notification, the administrator device 105 may display the unauthorized access notification. For example, the administrator device 105 may display a graphical user interface similar to graphical user interface 505, which is illustrated in FIG. 5.

At step 219, the steganography and change log management platform 102 may modify user access permissions for the user based on the detected unauthorized access. For example, the steganography and change log management platform 102 may impose additional restrictions, monitoring protocols, reduced access levels, and/or other security measures on the user.

Figure 3:
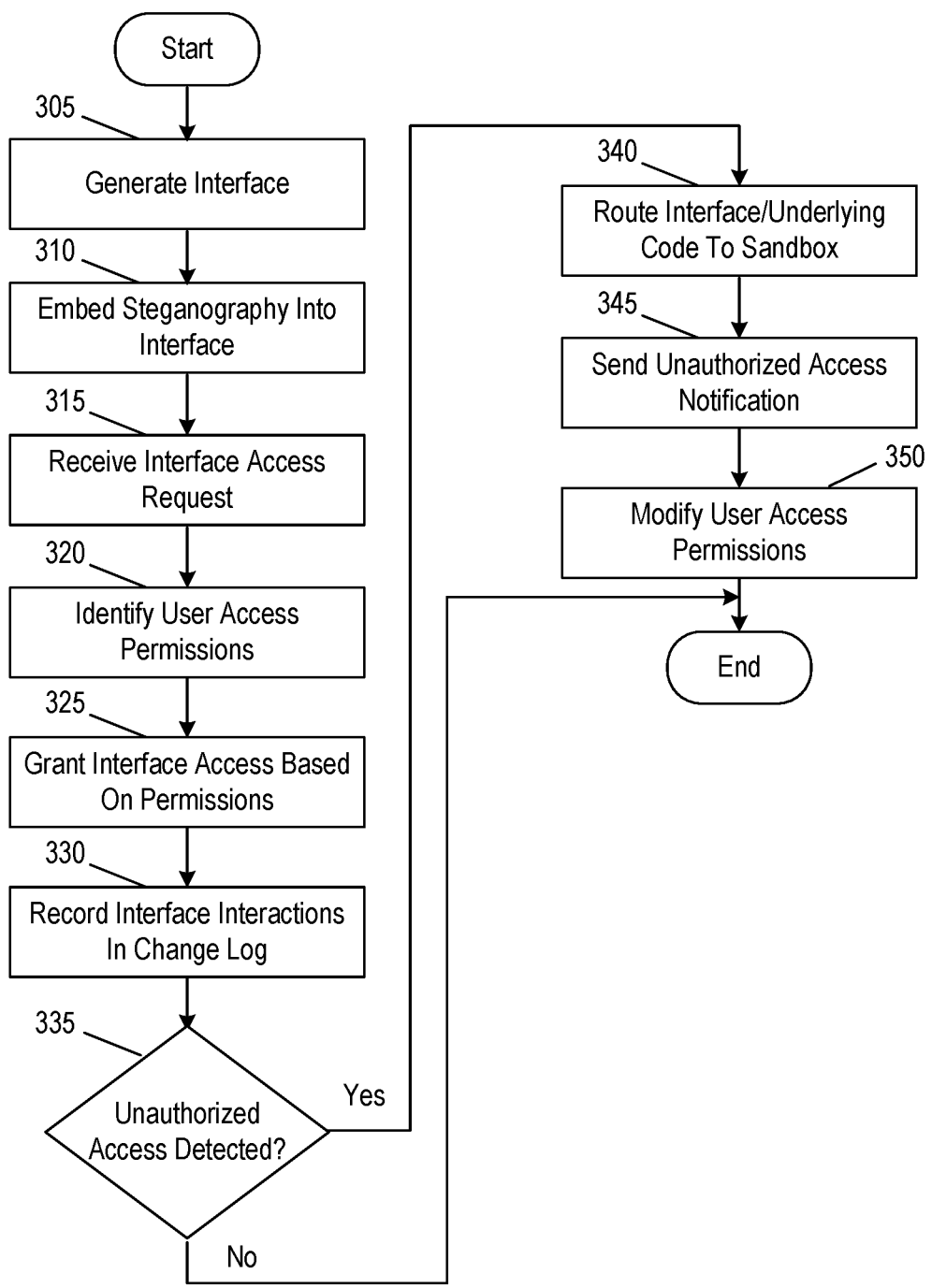
FIG. 3 depicts an illustrative method for using steganography for customized information access and change log management in accordance with one or more example embodiments in accordance with one or more example embodiments.

FIG. 3 depicts an illustrative method for using steganography for customized information access and change log management in accordance with one or more example embodiments in accordance with one or more example embodiments. At step 305, a computing platform having at least one processor, a communication interface, and memory may generate a user interface. At step 310, the computing platform may embed steganography into the user interface. At step 315, the computing platform may receive an interface access request from a user. At step 320, the computing platform may identify user access permissions for the user. At step 325, the computing platform may grant interface access based on the access permissions. At step 330, the computing platform may record interactions of the user with the interface in a change log. At step 335, the computing platform may compare the change log to the access permissions to identify whether unauthorized access is detected. If unauthorized access is detected, the computing platform may proceed to step 340. Otherwise, if unauthorized access is not detected, the method may end.

At step 340, the computing platform may route the interface and/or its underlying code to a sandbox for analysis. At step 345, the computing platform may send an unauthorized access notification to a relevant employee. At step 350, the computing platform may modify the user access permissions.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   generate a graphical user interface;
   embed, into the graphical user interface, steganography, wherein the steganography includes information corresponding to the graphical user interface that is not displayed on the graphical user interface;
   receive, from a user device of a user, an interface access request and user access credentials;
   identify, based on the user access credentials, access permissions of the user, wherein the access permissions define portions of the steganography to which the user has access;
   re-format, based on the access permissions, the steganography, wherein re-formatting the steganography comprises:
     relocating first information, to which the user has access, to an initial level of the steganography, and
     relocating second information, to which the user does not have access, to a second level of the steganography, wherein the second level of the steganography is embedded within the initial level of the steganography, wherein the initial level of the steganography and the second level of the steganography correspond to a steganography scheme;
   record, in a change log, interactions of the user with the graphical user interface;
   compare the interactions in the change log with the access permissions to identify whether or not unauthorized access is detected; and
   based on detecting the unauthorized access, initiate one or more security actions for the graphical user interface.

2. The computing platform of claim 1, wherein the graphical user interface includes one or more interface elements, and wherein the one or more interface elements include one or more of: an image, a video, a pixel, an audio file, or a non-fungible token.

3. The computing platform of claim 2, wherein the steganography is embedded within the one or more interface elements.

4. The computing platform of claim 1, wherein embedding the steganography comprises nesting a plurality of different levels of steganography within the graphical user interface.

5. The computing platform of claim 4, wherein the access permissions define that the user has access to a first level of steganography of the plurality of different levels of steganography and does not have access to a second level of steganography of the plurality of different levels of steganography.

6. The computing platform of claim 5, wherein the second level of steganography is embedded within the first level of steganography.

7. The computing platform of claim 1, wherein recording the interactions of the user comprises recording one or more of: decoding of the steganography, modification of the steganography, or addition of new steganography.

8. The computing platform of claim 1, wherein the steganography scheme is unique to the user.

9. The computing platform of claim 1, wherein initiating the one or more security actions comprises one or more of: routing the graphical user interface to a secure sandbox, routing the graphical user interface to an artificial intelligence (AI) engine, modifying the access permissions, or routing the graphical user interface for manual review.

10. The computing platform of claim 9, wherein the secure sandbox is configured to execute underlying code of the graphical user interface to identify errors.

11. The computing platform of claim 9, wherein the AI engine is configured to automatically identify errors.

12. A method comprising:
at a computing platform comprising at least one processor, a communication interface, and memory:
generating a graphical user interface;
embedding, into the graphical user interface, steganography, wherein the steganography includes information corresponding to the graphical user interface that is not displayed on the graphical user interface;
receiving, from a user device of a user, an interface access request and user access credentials;
identifying, based on the user access credentials, access permissions of the user, wherein the access permissions define portions of the steganography to which the user has access;
re-format, based on the access permissions, the steganography, wherein re-formatting the steganography comprises:
relocating first information, to which the user has access, to an initial level of the steganography, and
relocating second information, to which the user does not have access, to a second level of the steganography, wherein the second level of the steganography is embedded within the initial level of the steganography, wherein the initial level of the steganography and the second level of the steganography correspond to a steganography scheme;
recording, in a change log, interactions of the user with the graphical user interface;
comparing the interactions in the change log with the access permissions to identify whether or not unauthorized access is detected; and
based on detecting the unauthorized access, initiating one or more security actions for the graphical user interface.

13. The method of claim 12, wherein the graphical user interface includes one or more interface elements, and wherein the one or more interface elements include one or more of: an image, a video, a pixel, an audio file, or a non-fungible token.

14. The method of claim 13, wherein the steganography is embedded within the one or more interface elements.

15. The method of claim 12, wherein embedding the steganography comprises nesting a plurality of different levels of steganography within the graphical user interface.

16. The method of claim 15, wherein the access permissions define that the user has access to a first level of steganography of the plurality of different levels of steganography and does not have access to a second level of steganography of the plurality of different levels of steganography.

17. The method of claim 16, wherein the second level of steganography is embedded within the first level of steganography.

18. The method of claim 12, wherein recording the interactions of the user comprises recording one or more of: decoding of the steganography, modification of the steganography, or addition of new steganography.

19. One or more non-transitory computer-readable media storing instructions that, when executed by a computing platform comprising at least one processor, a communication interface, and memory, cause the computing platform to:
generate a graphical user interface;
embed, into the graphical user interface, steganography, wherein the steganography includes information corresponding to the graphical user interface that is not displayed on the graphical user interface;
receive, from a user device of a user, an interface access request and user access credentials;
identify, based on the user access credentials, access permissions of the user, wherein the access permissions define portions of the steganography to which the user has access;
re-format, based on the access permissions, the steganography, wherein re-formatting the steganography comprises:
relocating first information, to which the user has access, to an initial level of the steganography, and
relocating second information, to which the user does not have access, to a second level of the steganography, wherein the second level of the steganography is embedded within the initial level of the steganography, wherein the initial level of the steganography and the second level of the steganography correspond to a steganography scheme;
record, in a change log, interactions of the user with the graphical user interface;
compare the interactions in the change log with the access permissions to identify whether or not unauthorized access is detected; and
based on detecting the unauthorized access, initiate one or more security actions for the graphical user interface.

* * * * *